United States Patent
Chang et al.

(10) Patent No.: US 7,072,001 B2
(45) Date of Patent: Jul. 4, 2006

(54) MULTI-AXIS ADJUSTING APPARATUS FOR A LIGHT ENGINE IN A PROJECTION SYSTEM

(75) Inventors: Fan-Chieh Chang, Hsinchu (TW); Kuo-Wen Chen, Hsinchu (TW)

(73) Assignee: Coretronic Corporation, Miao-Li (TW)

( * ) Notice: Subject to any disclaimer, the term of this patent is extended or adjusted under 35 U.S.C. 154(b) by 532 days.

(21) Appl. No.: 10/248,400

(22) Filed: Jan. 16, 2003

(65) Prior Publication Data

US 2003/0137612 A1   Jul. 24, 2003

(30) Foreign Application Priority Data

Jan. 18, 2002   (TW) .............................. 91200736 U

(51) Int. Cl.
H04N 5/64   (2006.01)
H04N 5/645   (2006.01)
H04N 5/655   (2006.01)

(52) U.S. Cl. ....................... 348/785; 348/825; 348/827; 248/580; 248/581; 362/270; 362/273; 362/289

(58) Field of Classification Search ................ 348/745, 348/785, 787, 789, 825, 827; 362/270, 273, 362/289; 248/580, 581; H04N 5/64, 5/645, H04N 5/655
See application file for complete search history.

(56) References Cited

U.S. PATENT DOCUMENTS

| 6,318,694 B1 * | 11/2001 | Watanabe | 248/371 |
| 6,421,100 B1 * | 7/2002 | Fleetwood | 348/745 |
| 6,709,114 B1 * | 3/2004 | Duggan et al. | 353/74 |
| 6,871,984 B1 * | 3/2005 | Chang et al. | 362/419 |
| 2004/0263790 A1 * | 12/2004 | VanOverloop et al. | 353/31 |

* cited by examiner

Primary Examiner—Brian P Yenke
(74) Attorney, Agent, or Firm—Winston Hsu

(57) ABSTRACT

A multi-axis adjusting apparatus includes a base with an upper surface, and each side of a central line of the base has at least one slot; a sliding seat, which is set on the upper surface of the base, and each of two ends of an upper surface of the sliding seat has at least one screw hole, each position of two sides of the upper surface of the sliding seat corresponding to the slot has at least one sliding plate, which has a U-shaped slot; a plurality of fixing screws, which are inserted into the U-shaped slot and the slot; a carrier, which is mounted on the upper surface of the sliding seat, and each of two ends of the upper surface corresponding to the screw hole has at least one fillister with one penetrating hole; plural adjusting screws are going through the screw holes and connecting to the penetrating holes by way of a floating structure. It is therefore the function of simultaneous adjustment of the multi-axis can be approached to rapidly complete the adjustment and reduce cost.

11 Claims, 6 Drawing Sheets

MULTI-AXIS ADJUSTING APPARATUS FOR A LIGHT ENGINE IN A PROJECTION SYSTEM

BACKGROUND OF INVENTION

1. Field of the Invention

This invention is related to a projection system, especially an adjusting apparatus of a light engine in the projection system.

2. Background of the Invention

In recent years, the dramatic development of electro-optical technologies has made data visualization a popular issue. The demand and importance for a projection device capable of displaying data have impressed the electronics industry. Therefore, projection device manufacturers make an effort to provide a projection device that produces high image quality.

Please refer to FIG. 1, which is a schematic diagram of a rear projection television according to the prior art. The television comprises a housing 11, a base 12 installed inside the housing 11, an adjusting apparatus 20 installed on an upward surface of the base 12, and a light engine 13 installed on an upward surface of the adjusting apparatus 20. The light engine 13 emits light beams that contain image information onto a first mirror 14 that is installed at a position in front of the light engine 13. The rear projection television further comprises a second mirror 16 installed at a position inside of a screen 15, the position being on a light path the light emitted by the light engine 13 reflects from the first mirror 14 onto the second mirror 16. The second mirror 16 reflects the light beams reflected from the first mirror 14 onto the screen 15. The light engine 13, the first mirror 14, the second mirror 16, and the screen 15 constitute a projection system of the television. To guarantee that the images projected by the projection system of the television onto the screen 15 does not contain any aberrations or distortions, the light engine 13, the first mirror 14, the second mirror 16, and the screen 15 of the projection system must be precisely adjusted and delicately fabricated to reduce any potential errors.

Please refer to FIG. 2, which is a schematic diagram of the adjusting apparatus 20 according to the prior art. The adjusting apparatus 20 adjusts the path the light beams emitted by the light engine 13 travel with a direction-adjusting apparatus. A raising screw 211 is installed on a central region of a downward surface of a horizontally disposed raiser 21 for controlling vertical movement of the raiser 21. A first displacement plate 22 is installed on a central region of an upward surface of the raiser 21. Two limited blocks 221 (only one is shown) are respectively installed on the raiser 21 beside two opposite sides of the first displacement plate 22 for preventing the first displacement plate 22 from moving to the left or right. A forward-and-backward adjustment screw 222 is installed on a front side of the first displacement plate 22 for controlling forward and backward movement of the first displacement plate 22. Similarly, a second displacement plate 23 is installed on a central region of an upward surface of the first displacement plate 22. Two limited blocks 231 are respectively installed on two opposite sides of the second displacement plate 23 for preventing the second displacement plate 23 from moving forward and backward. A left-and-right adjustment screw 232 is installed on a right side of the second displacement plate 23 for controlling left and right movement of the second displacement plate 23. Finally, a rotatable plate 24 is installed on a central region of an upward surface of the second displacement plate 23. A holder 241 is used for supporting the rotatable plate 24. A screw 242 is installed on a side of the rotatable plate 24 and controls the rotational motion of the rotatable plate 24. Therefore, the light engine 13, which is installed on the adjusting apparatus 20, can emit the light beams onto a region in any direction.

However, the bulk of the pile-structured adjusting apparatus 20 is contradictory to the design beliefs for modern information products: light, thin, short, and small. Additionally, the adjusting apparatus 20 can only rotate the light engine 13 horizontally (around a normal line of each of the plates of the adjusting apparatus 20), rather than vertically. "Furthermore, each dimension adjusting is independent and cause optical adjusting cannot easily and quickly complete.

SUMMARY OF INVENTION

The objective of the present invention is to provide a multi-axis adjusting apparatus to adjust a light engine with multi-axis adjustment for maintaining angles and display quality while assembling a projection system.

The other objective of the present invention is to provide a multi-axis adjusting apparatus to simplify a whole volume of an adjusting base for reducing occupied room of the adjusting apparatus.

The third objective of the present invention is to provide a multi-axis adjusting apparatus to simultaneously engage adjustment with relative axes for simplifying operation and speeding up adjusting time.

To approach above objectives, the multi-axis adjusting apparatus comprises a base with an upper surface, and each side of a central line of the base has at least one slot; a sliding seat, which is set on the upper surface of the base, and each of two ends of an upper surface of the sliding seat has at least one screw hole, each position of two sides of the upper surface of the sliding seat corresponding to the slot has at least one sliding plate, which has a U-shaped slot; a plurality of fixing screws, which are inserted into the U-shaped slot and the slot; a carrier, which is mounted on the upper surface of the sliding seat, and each of two ends of the upper surface corresponding to the screw hole has at least one fillister with one penetrating hole; plural adjusting screws are going through the screw holes and connecting to the penetrating holes by way of a floating structure.

DETAILED DESCRIPTION

A preferred embodiment of the present invention will be explained with reference to the accompanying drawings.

Figure 1:
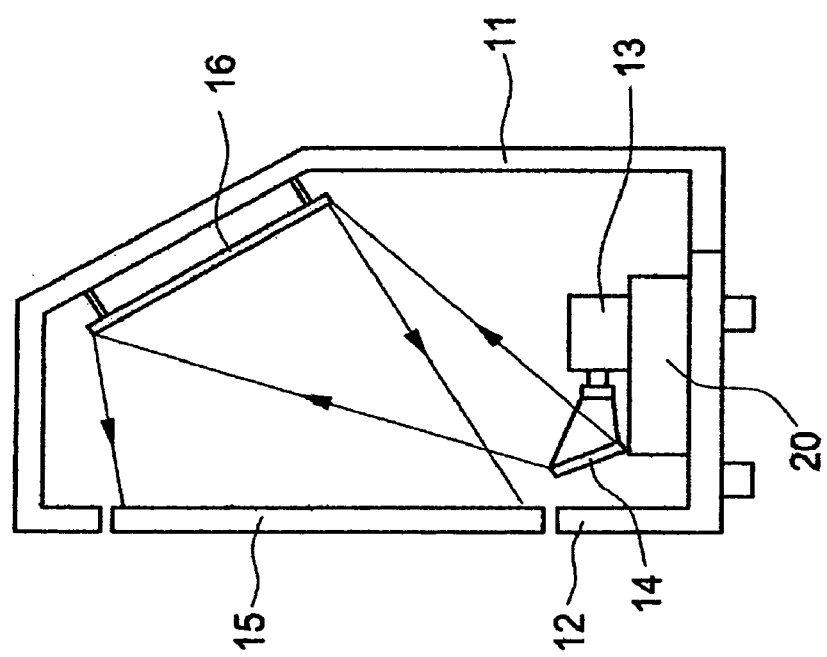
FIG. 1 is a schematic diagram of a rear projection television according to the prior art.
Figure 2:
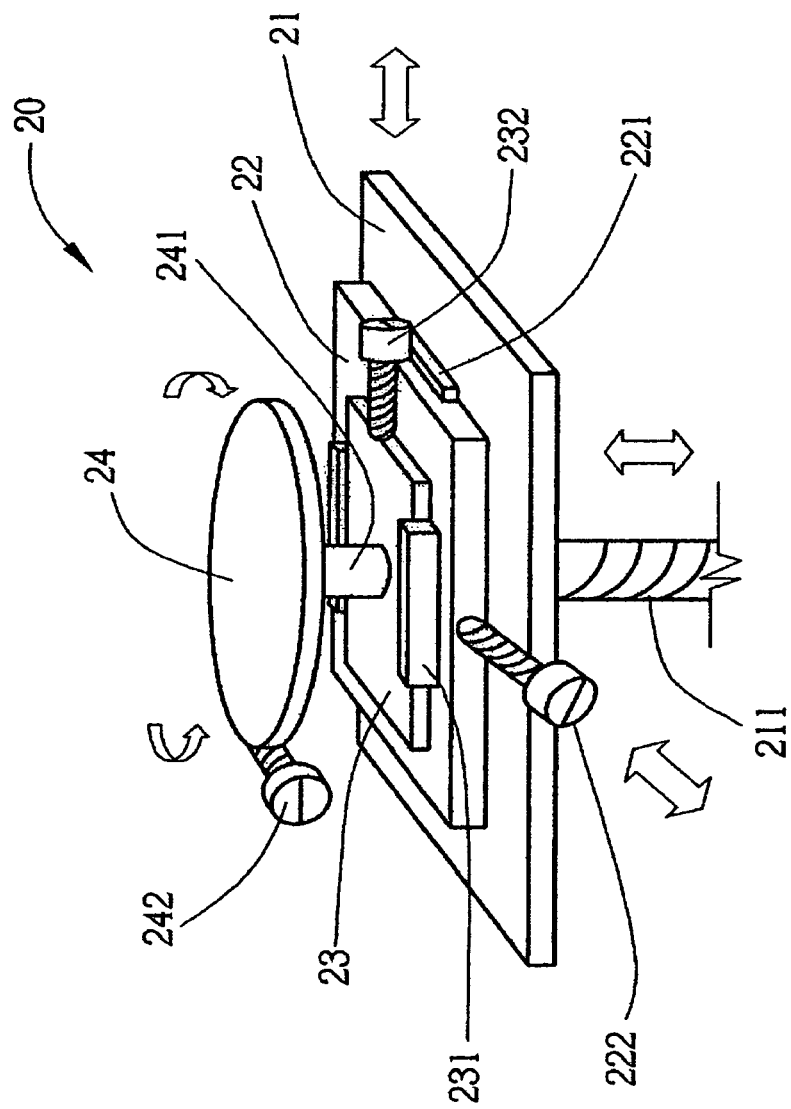
FIG. 2 is a schematic diagram of an adjusting according to the prior art.
Figure 3:
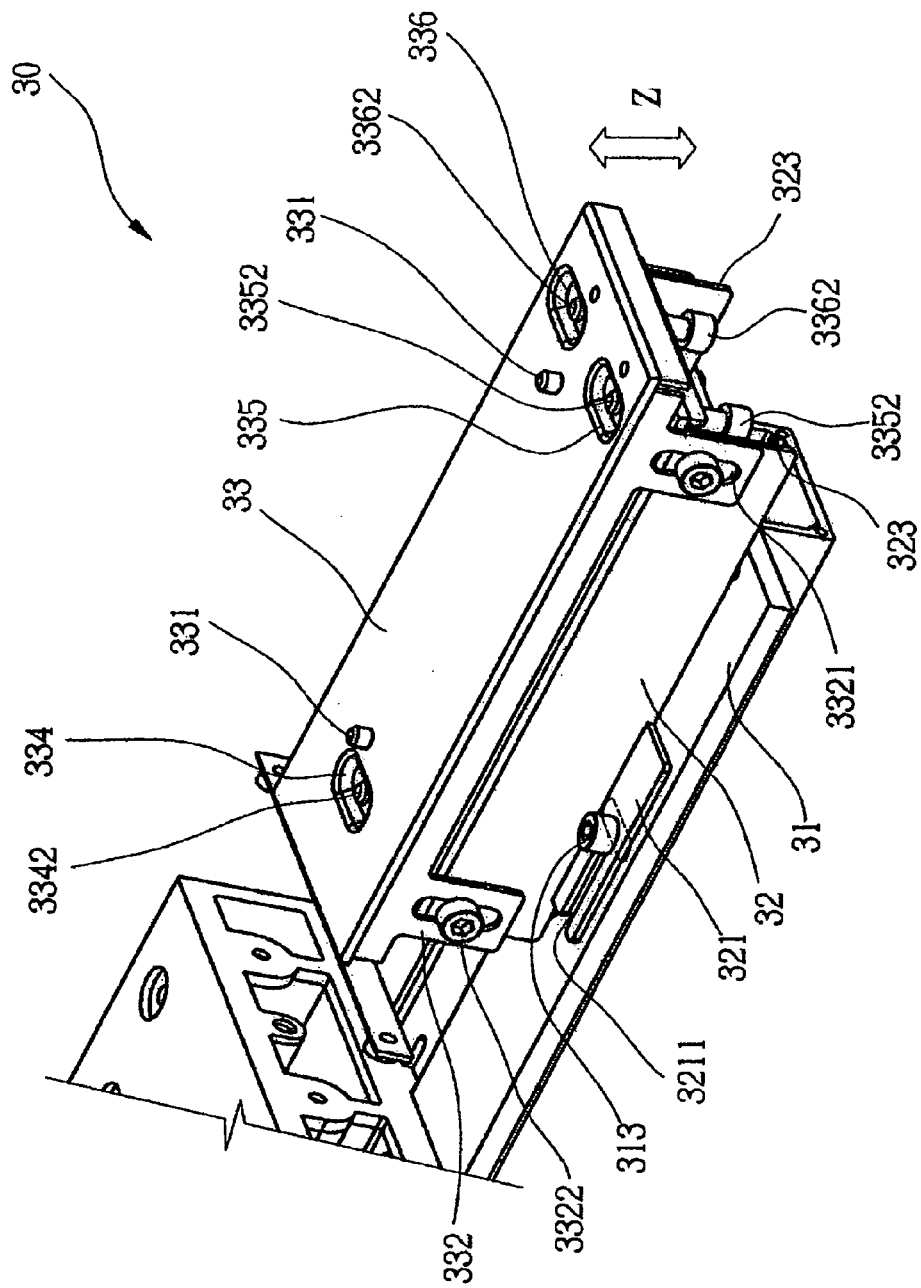
FIG. 3 is a perspective view of a multi-axis adjusting apparatus according to the present invention.
Figure 4:
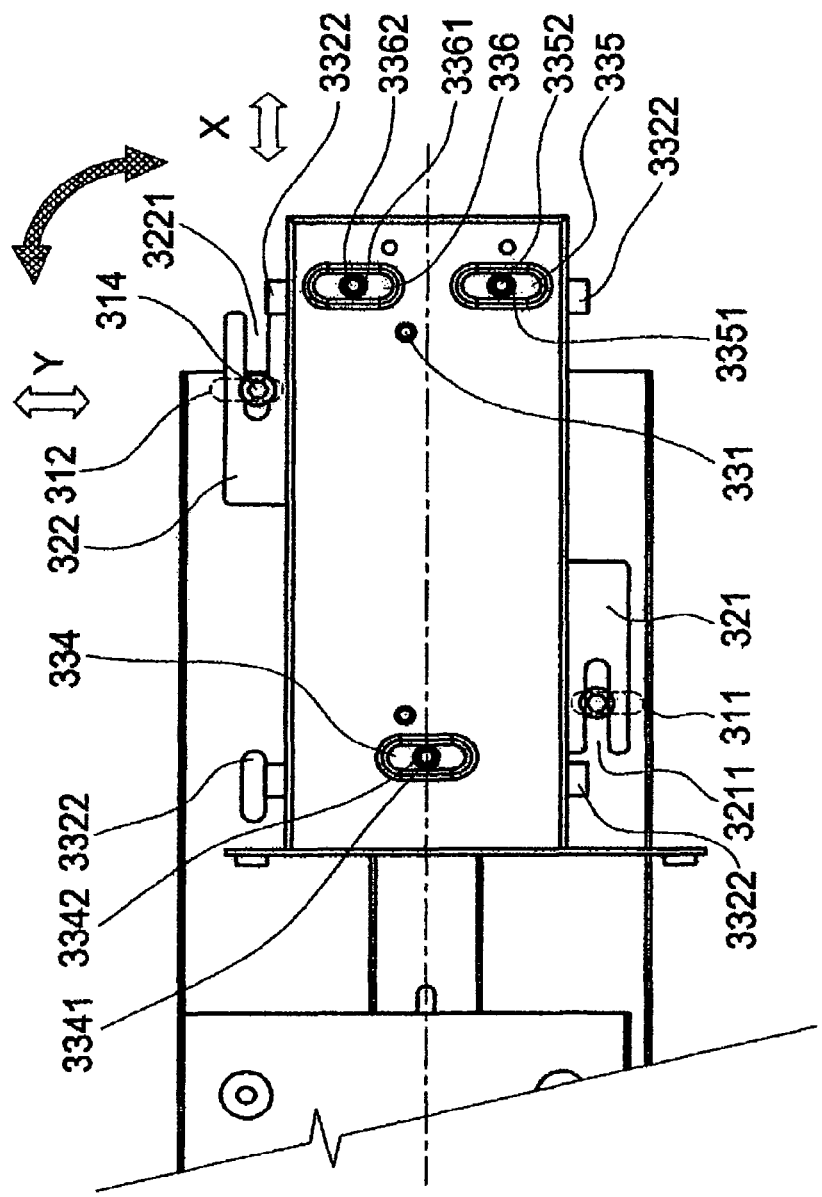
FIG. 4 is a top view of a multi-axis adjusting apparatus according to the present invention.

Please refer to FIGS. 3 and 4, the adjusting apparatus 30, used in light engine, comprises a base 31, a sliding seat 32 installed on an upper surface of the base 31, a carrier 33 installed on an upper surface of the sliding seat 32, and at least one fixing pin 331 installed on an upper surface of the carrier 33 for fixing and adjusting a light engine (not shown). Along a central line of the upper surface of the base 31 has the n-shaped sliding seat 32, relative positions of diagonals of two sides of the sliding seat 32 have protrusive sliding plates 321 and 322. The sliding plates 321 and 322 are close and smooth to the upper surface of the base 31, and two U-shaped slots 3211 and 3221 with reverse opening are along the central line of base 31. Corresponding to central locations of the U-shaped slots 3211 and 3221 and a direction of a central line perpendicular to base 31 fit two slots 311 and 312, which independently form with the two U-shaped slots 311 and 312 as two spiders. Two fixing screw 313 and 314 individually penetrate through U-shaped slots 3211 and 3221 and the slots 311 and 312 to fix the sliding plates 321 and 322 on the base 31. The fixing screw 313 and 314 freely move back and forth in slots while in loose for convenient adjustment.

Figure 5:
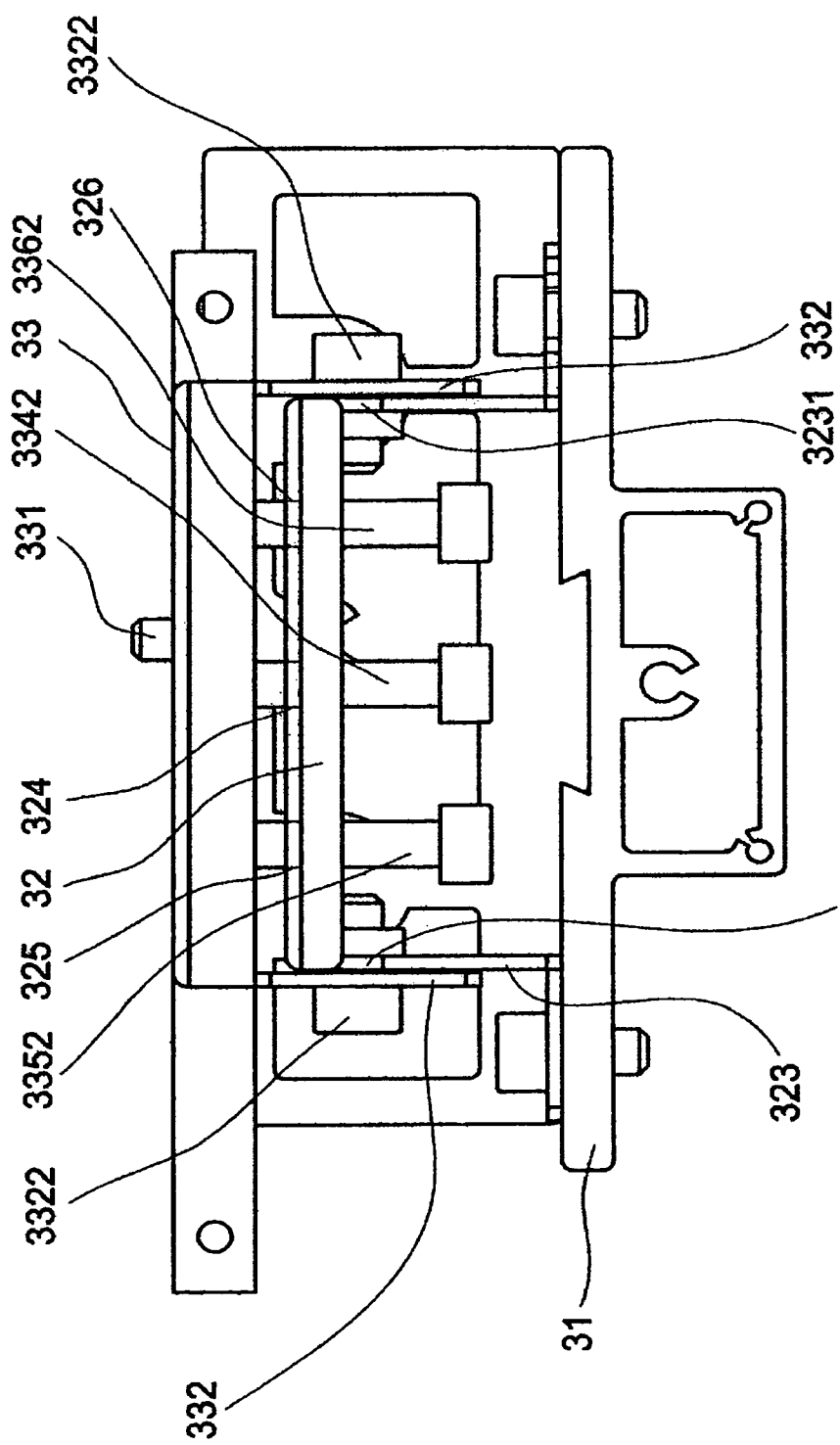
FIG. 5 is a side view of a multi-axis adjusting apparatus according to the present invention.

Besides, as shown in FIG. 5, the carrier 33 is put on an upper surface of the sliding seat 32. Two sides of the carrier 33 have two braces 332 extending downward perpendicularly. The brace 332 is formed on an outer side of a supporter 323 of the sliding seat 32. The brace 332 is not fully close to a surface of the supporter 323 and keeps a suitable distance with the supporter 323 for the carrier 33 executing lateral rotation. A vertical Z-axis slot 3321 is formed at a central part of the brace 332, and a positioning screw 3322 penetrates through a vertical Z-axis slot 3321 so as to that the positioning screw 3322 being fixed in a screw hole 3231. An end of the upper surface of the carrier 33 is designed a fillister 334, the other end whose two sides have other two fillisters 335 and 336. Each of the fillisters 334, 335 and 336 has a hole, and three of them are 3341, 3351 and 3361. Respectively, three screw holes 324, 325 and 326 are installed corresponding to holes 3341, 3351 and 3361. Adjusting screws 3342, 3352 and 3362 go through screw holes 324, 325, 326 and holes 3341, 3351 and 3361 of fillisters 334, 335 and 336 so as to that depths of the fillisters 334, 335, 336 are capable of not affecting the light engine fastened on the carrier 33 while adjusting the rear end of the adjusting screws 3342, 3352 and 3362.

Figure 6:
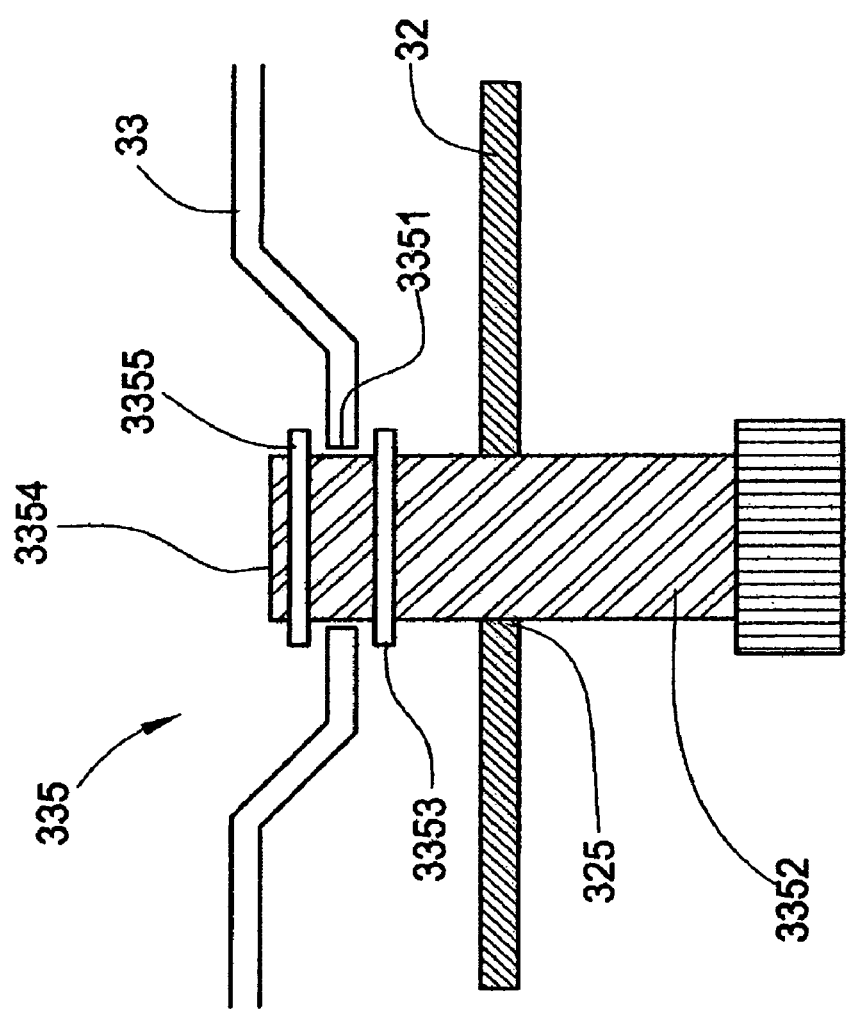
FIG. 6 is a cross-sectional view of a floating connecting structure of the present invention.

Because adjusting screws 3342, 3352 and 3362 are independently capable of moving up and down, thus the adjusting screws connect to the carrier 33 by way of floating. Referring to FIG. 6, each adjusting screw adopts the same connecting way to connect to each fillister, such as screws 3342, 3352 and 3362 individually connecting to the fillisters 334, 335 and 336. Taking fillister 335 as an example, a rear end of the adjusting screw 3352 locks into the screw hole 325 of the sliding seat 32, and inserts into a washer 3353, which is able to fasten on the adjusting screw 3352, continuously goes through the hole 3351 of the fillister 335 so as to that the rear end of the adjusting screw 3352 extends out of the fillister 335; a ring fillister 3354 is around the end to infix a C-shaped clamp 3355, and the adjusting screw 3352 gets through a rim of the hole 3351 for existing between the C-shaped clamp 3355 and the washer 3353. The C-shaped clamp 3355 maintains a suitable tightness to retain an appropriate space for the carrier 33 being in between C-shaped clamp 3355 and the washer 3353, therefore adjusting each of the adjusting screws 3342, 3352 and 3362 is to push up and pull down C-shaped clamp 3355 and washer 3353 for lifting and lowering the carrier 33.

Firstly loosing the fixing screws 313 and 314 while in use, and the fixing screws 313 and 314 move along with the U-shaped slots 3211 and 3221 of the sliding plates 321 and 322 and slots 311 and 312 of the base 31. Due to an opening of the U-shaped slot 3211 is opposite to an opening of the U-shaped slot 3221, the sliding seat 32 is limited to move within a certain range, therefore the fixing screws 313 and 314 will not be out of U-shaped slots 3211 and 3221 so as to that avoiding the sliding seat 32 to fall off causing damage of the light engine. On the other hand, movements of X and Y axes are executed simultaneously, thus not only the sliding seat can be adjusted for the movements of X and Y axes, but also that rotating angles are adjustable by way of the sliding plate 321 closing onto the upper surface of the base 31. Hence, once adjusting the fixing screws 313 and 314, and the movements of X and Y-axes and rotation are then done.

Inclination angles of right, left, front and rear of Z-axis of the carrier 33 are adjustable for the present invention. Firstly, loosening the fixing screw 3322 of the carrier 33, and lifting or lowering the adjusting screws 3342, 3352 and 3362 to push up or pull down the carrier 33. Then, Dividing the adjusting screws into two groups of front adjusting screw 3342 and rear adjusting screws 3352 and 3362. Once fixing one of the two groups to adjust the other group for adjusting the inclination angles of front and rear; similarly, the inclination of right and left can be done. Especially the three-dimension angles can be done by one-time adjustment. That is, loosing the fixing screw 3322 of the carrier 33 and individually lifting or lowering each adjusting screws 3342, 3352 and 3362 so as to that concurrently approaching the needs of inclination angles of Z-axis, front, rear, right and left. Then fixing the adjusting screws 3342, 3352 and 3362 to finish the adjustment of the light engine.

Similarly, via the floating structure of the C-shaped clamps and the washers to clamp the carrier 33 with suitable forces can be replaced with a ball-axis structure. Another point, due to the carrier 33 firmly being supported by several adjusting screws, braces 332 and positioning screw 3322 are not needed as well; hence the adjusting screws can directly play the role to adjust and fix the carrier 33.

As aforesaid, the present invention has the following functions:

1. All screws, such as positioning screw, adjusting screws, can execute the six-dimension adjustments of front, rear, right, left, rotating, up, down, inclinations of front and rear, and the present invention is full of more options for adjustment than prior arts.

2. When loosing the fixing screws or positioning screws, the three-dimension can be done at the same time for rapidly completing adjustment and reducing costs.

3. Via the simplified mechanism, the whole volume is reduced, and an occupied space of the present invention is smaller than the overlapping mechanism of prior arts.

Moreover, the preferable embodiment described in above section is to illustrate the invention in a detailed way and is not limitation to the scope of the invention. Those who are skilled in such arts should understand that their appropriate and slight variation and modification still keep the merits of the invention and are also within the spirit and scope of the invention.

What is claimed is:

1. A multi-axis adjusting apparatus comprising:
   a base having an upper surface, and each side of a central line of the base having at least one slot;
   a sliding seat being set on the upper surface of the base, and each of two ends of an upper surface of the sliding seat having at least one screw hole, each position of two sides of the upper surface of the sliding seat corresponding to the slot having at least one sliding plate with a U-shaped slot;

a plurality of fixing screws inserted into the U-shaped slot and the slot;

a carrier mount on the upper surface of the sliding seat, and each of two ends of the upper surface corresponding to the screw hole having at least one fillister with one hole; and a plurality of adjusting screws going through the screw holes and connecting to the holes by way of a floating structure.

2. The multi-axis adjusting apparatus of claim 1, wherein the slot is set along with a central line perpendicular to the base.

3. The multi-axis adjusting apparatus of claim 1, wherein the U-shaped slot is set along with a central line parallel to the sliding seat, and two openings of the two U-shaped slots are set with reversely.

4. The multi-axis adjusting apparatus of claim 1, wherein the floating structure is that setting at least one C-shaped clamp and one washer on a rear end of the adjusting screws to suitably clamp a rim of the hole of the carrier.

5. The multi-axis adjusting apparatus of claim 1, wherein the floating structure is that a ball-axis connecting to the hole of the carrier is on an end of the adjusting screws.

6. The multi-axis adjusting apparatus of claim 1, wherein two sides of the carrier have two braces formed on two outer sides of two side braces of two sliding seats, and the brace keeps a suitable distance with the side brace; a vertical Z-axis slot is formed the brace, and a positioning screw penetrates through the vertical Z-axis slot.

7. The multi-axis adjusting apparatus of claim 1, wherein an upper surface of the carrier has at least one fixing pin.

8. The multi-axis adjusting apparatus of claim 1, wherein around an end of the multi-axis adjusting apparatus has an adjusting screw, a screw hole and a fillister along with a central line, another end has an adjusting screw, a screw hole and a fillister along with two sides of the central line.

9. The multi-axis adjusting apparatus of claim 1, wherein the sliding plate is close and smooth to the base.

10. The multi-axis adjusting apparatus of claim 1, wherein each of two sides of the sliding seat has a sliding plate.

11. The multi-axis adjusting apparatus of claim 10, wherein the two sliding plates are set on relative positions of diagonals.

* * * * *